United States Patent [19]

Grunberg

[11] Patent Number: 4,878,396

[45] Date of Patent: * Nov. 7, 1989

[54] CONTROL MECHANISM FOR A MECHANICAL COUPLING DEVICE

[75] Inventor: Pierre Grunberg, Paris, France

[73] Assignee: Valeo, Paris, France

[ * ] Notice: The portion of the term of this patent subsequent to Jun. 9, 2004 has been disclaimed.

[21] Appl. No.: 921,842

[22] Filed: Oct. 24, 1986

Related U.S. Application Data

[63] Continuation of Ser. No. 475,633, Mar. 15, 1983, abandoned.

[30] Foreign Application Priority Data

Mar. 18, 1982 [FR] France ................................. 82 4603
Feb. 25, 1983 [FR] France ................................. 83 3115

[51] Int. Cl.<sup>4</sup> ...................... G05G 1/04; F16D 13/75; F16D 23/12
[52] U.S. Cl. .................... 74/518; 74/83.17; 74/83.19; 74/516; 74/103; 192/90; 192/99 S; 192/111 A
[58] Field of Search ...................... 74/512, 518, 89.17, 74/89.18, 89.19, 422, 2, 388, 516, 437, 517, 100 R, 97, 109; 192/0.02 R, 99 S, 66, 90, 89 B, 89 QT, 109 R, 109 A; 360/96.5, 105, 96.1; 354/195.1, 195

[56] References Cited

U.S. PATENT DOCUMENTS

| | | |
|---|---|---|
| 2,621,538 | 12/1952 | Bechman . |
| 3,302,763 | 2/1967 | Wobrock . |
| 3,572,143 | 3/1971 | Riemsdijk ............................ 74/437 |
| 3,756,088 | 9/1973 | Inoue ................................. 74/89.17 |
| 3,813,953 | 6/1974 | Wojtowicz ........................ 74/89.17 |
| 3,913,113 | 10/1975 | Yamashita ........................... 354/195 |
| 3,961,517 | 6/1976 | DiMaio .............................. 74/89.17 |
| 3,961,545 | 6/1976 | Petresh et al. ......................... 74/517 |
| 4,071,859 | 1/1978 | Sami ................................... 360/105 |
| 4,295,169 | 10/1981 | Iwata et al. ......................... 360/105 |
| 4,319,497 | 3/1982 | Shinto . |
| 4,393,907 | 7/1983 | Kronstadt .............................. 74/2 |
| 4,456,360 | 6/1984 | Tamura ............................ 354/195.1 |
| 4,530,252 | 7/1985 | Sarges et al. ...................... 74/100 R |
| 4,619,151 | 10/1986 | Trachman et al. ....................... 74/2 |
| 4,650,056 | 3/1987 | Sevennel et al. .................. 192/99 S |
| 4,671,400 | 6/1987 | Grunberg et al. ................. 192/99 S |

FOREIGN PATENT DOCUMENTS

| | | |
|---|---|---|
| 393150 | 12/1908 | France . |
| 11208 | 12/1909 | France . |
| 1144189 | 10/1957 | France .............................. 74/89.17 |
| 2365161 | 4/1978 | France . |
| 2380160 | 9/1978 | France . |
| 2458433 | 1/1981 | France . |
| 2541793 | 8/1984 | France .............................. 192/99 S |
| 382088 | 10/1932 | United Kingdom . |
| 959081 | 5/1964 | United Kingdom . |
| 1081798 | 8/1967 | United Kingdom . |
| 2043805 | 10/1980 | United Kingdom . |
| 2117076 | 10/1983 | United Kingdom ............. 192/99 S |
| 2134210 | 8/1984 | United Kingdom ............. 74/89.17 |

*Primary Examiner*—Vinh Luong
*Attorney, Agent, or Firm*—Charles E. Brown; Charles A. Brown

[57] ABSTRACT

A control mechanism for a machine element of the type including a fixed part and a movable part movable between two limit positions, e.g. an automotive vehicle clutch. A spring biases the movable part to one of its limit positions. The control mechanism comprises a linkage for controlling the displacement of the movable part between its limit positions. A motor drives the linkage, and a resilient device is coupled to the linkage for reducing the force applied by the motor for displacing the movable part between its limit positions.

13 Claims, 11 Drawing Sheets

CONTROL MECHANISM FOR A MECHANICAL COUPLING DEVICE

This application is a continuation, now abandoned, of application Ser. No. 475,633, filed 3/15/83.

BACKGROUND OF THE INVENTION

This invention relates to a control mechanism for a coupling device, such as a clutch, a speed variator, or a brake, the state of which is modified as a function of the position of a movable train which is movable in both directions through a stroke defined between two limit positions, this train comprising elastic return means in a first of its two limit positions, whilst opposing means associated with the train is movable through a stroke corresponding, position by position, to that of the train and is adapted to act upon the train in order to transfer the latter from its first limit position into its second limit position and vice versa.

This is particularly the case in clutches where, for example, a friction disc is adapted to be clamped between a reaction plate and a pressure plate by the action of a spring, generally in the form of a diaphragm. The clutch occupies the engaged state by the elastic action of the diaphragm which, bearing against a cover connected to the reaction plate, exerts an elastic clamping action upon the pressure plate.

The clutch is transferred from this state of engagement into a state of disengagement by the action of the opposing means which acts upon the movable train formed by the pressure plate and the diaphragm.

This means generally comprises a stop movable in translation, called the clutch release bearing, which acts upon a central part of the diaphragm in order to cancel at will the elastic clamping action of the diaphragm upon the pressure plate. The means comprises, apart from this release bearing, a kinematic chain which generally consists of a fork, levers, rods et cetera.

The means may be operated either manually, such as by a clutch disengaging pedal, or by automatic means.

The operative means generally make the opposing means act upon the train by the effect of a force. If this force is zero or weaker than that of the diaphragm, the clutch is in the totally or partially disengaged state. If, on the other hand, the operating force preponderates over that of the diaphragm, the clutch is transferred into the disengaged state.

In the case of a manual control mechanism where the opposing means is actuated from a clutch disengaging pedal, the driver can, as sensitively as he desires, transfer the train from its first limit position of engagement into its second limit position of disengagement and vice versa, by modulating the force exerted by his foot upon the pedal.

In the case of an automatic control mechanism, the opposing means is generally subject to an operative means acting by the effect of a force which is either in play or out of play.

In the inactive condition of the automatic operative means by the effect of force, the clutch is engaged. In the active condition of this automatic operative means by the effect of force, the means overcomes the elastic resistance exerted by the diaphragm and transfers the clutch into its disengaged state.

However, such an automatic control mechanism does not generally possess the sensitivity of operation of the foot upon a pedal, whilst it necessitates the development of fairly high power.

Similar remarks apply to the control mechanism of a speed variator, for example with variable-spaced pulleys and belt, in which the spacing of the pulleys in subject to the action of diaphragms and can be modified by an opposing means which is required, by the effect of force, to overcome the elastic resistance of the diaphragm.

Whatever the field of application, the exertion in an automatic control mechanism of a considerable power comparable to that of a manual control mechanism involves, for the driving means and their accessories, considerable dimensions, a high expenditure of energy, and difficult conditions to activate and de-activate the driving means, all without the benefit of comparable sensitivity to that of a manual control mechanism.

This invention relates to a control mechanism for a coupling device such as a clutch, a speed variator, a brake et cetera, which is free of these disadvantages and which is adapted to be automated, with low power and high sensitivity, in a simple construction of small dimensions.

SUMMARY

According to the invention, a control mechanism for a coupling device such as a clutch, a speed variator, or a brake, the state of which is modified as a function of the position of a train which is movable in both directions through a stroke defined between two limit positions, this train comprising elastic return means in a first of its two limit positions whilst opposing means associated with the train is movable through a stroke corresponding, position by position, to that of the train and is adapted to act upon the train in order to transfer the latter from its first limit position into its second limit position and vice versa, is characterised in that the opposing means cooperates, on the one hand, with positioning operative means, and on the other hand, with elastic operating force moderating means.

By virtue of this arrangement, elastic operating force moderating means permit a reduced power to be adopted for the operative means. Since the latter are positioning, they in no way reduce the effective capacity of the elastic return means of the train and the latter are therefore still made to produce their full effect.

According to another characteristic, the elastic moderating means are constructed to exert upon the opposing means a force which, in absolute value and in opposition, varies as a function of the stroke of the means approximately according to the same law as that according to which the force of the elastic return means is itself made to vary as a function of the stroke of the train.

Preferably, in every position of the stroke of the opposing means, the instantaneous value of the force of the elastic operative means is substantially equal, and of opposite direction, to that of the force of the elastic return means in the corresponding position of the stroke of the train.

In one embodiment, these elastic moderating means comprise either compensating means acting upon the opposing means in the direction towards the second limit position, or stabilising means, the action of which is reversed when the opposing means passes through an intermediate position located between the two limit positions, or, preferably, such compensating means and such stabilising means simultaneously.

The compensating means which always act in the opposite direction to that of the return means have the effect of making the operating force minimal in an intermediate position of the opposing means located between these two limit positions. The operating force, which is minimal in this intermediate position, exhibits maxima of opposite direction in the two limit positions.

The stabilising means, provided inoperative in this intermediate position, act precisely in the limit positions and in their proximity, so that they reduce the maxima of the operating force in these limit positions.

In this way the operating force is rendered low throughout the stroke, which makes it possible to provide operative means of low power.

This results in extreme convenience in the choice of the operative means, particularly in an installation which is automated in whole or in part.

As a variant, the elastic moderating means act upon the gear through the intermediary of a movement transmission means which breaks down the force applied to this device into, on the one hand, an inactive component absorbed by the train, and on the other hand, an active component which obeys the law of variation of the force as a function of the stroke.

In an embodiment, this transmission means comprises a pinion fitted rotatably about an axis and meshing with a rack connected to the opposing means, the elastic moderating means comprising at least one spring, one end of which is attached to an anchorage point and the other end of which is attached to said pinion, the inactive component being radial and absorbed by the axis of the pinion, whereas the active component is tangential and transmitted to the rack.

DETAILED DESCRIPTION OF THE DRAWINGS

Reference is made first to FIGS. 1 to 9, which relate, by way of non-limiting example, to the application of the invention to the control mechanism of a coupling device consisting of a diaphragm clutch suitable for a motor vehicle.

The clutch (FIGS. 1 and 7) comprises a cover 10 adapted to be fixed to the flywheel 11 of the engine of the motor vehicle. This flywheel 11 forms a reaction plate. The clutch likewise comprises a friction disc 12 which is coupled to the primary shaft 13 of the gearbox of the motor vehicle. The disc 12 is adapted to be clamped between the reaction plate 11 and a pressure plate 14 by an elastic clamping action of a spring 15 in the form of a diaphragm.

Figure 1:
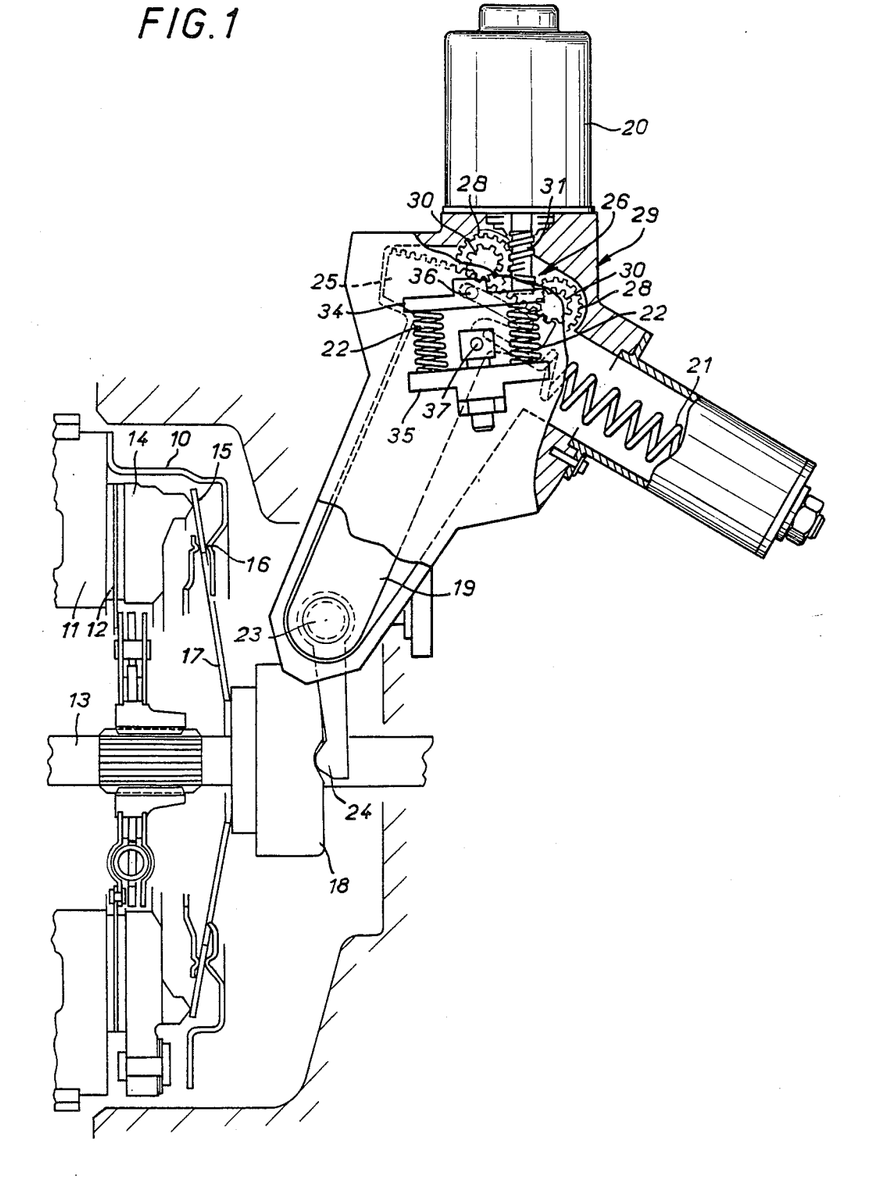
FIG. 1 is a view of a clutch control mechanism according to the invention, the clutch being shown in the disengaged state.
Figure 6:
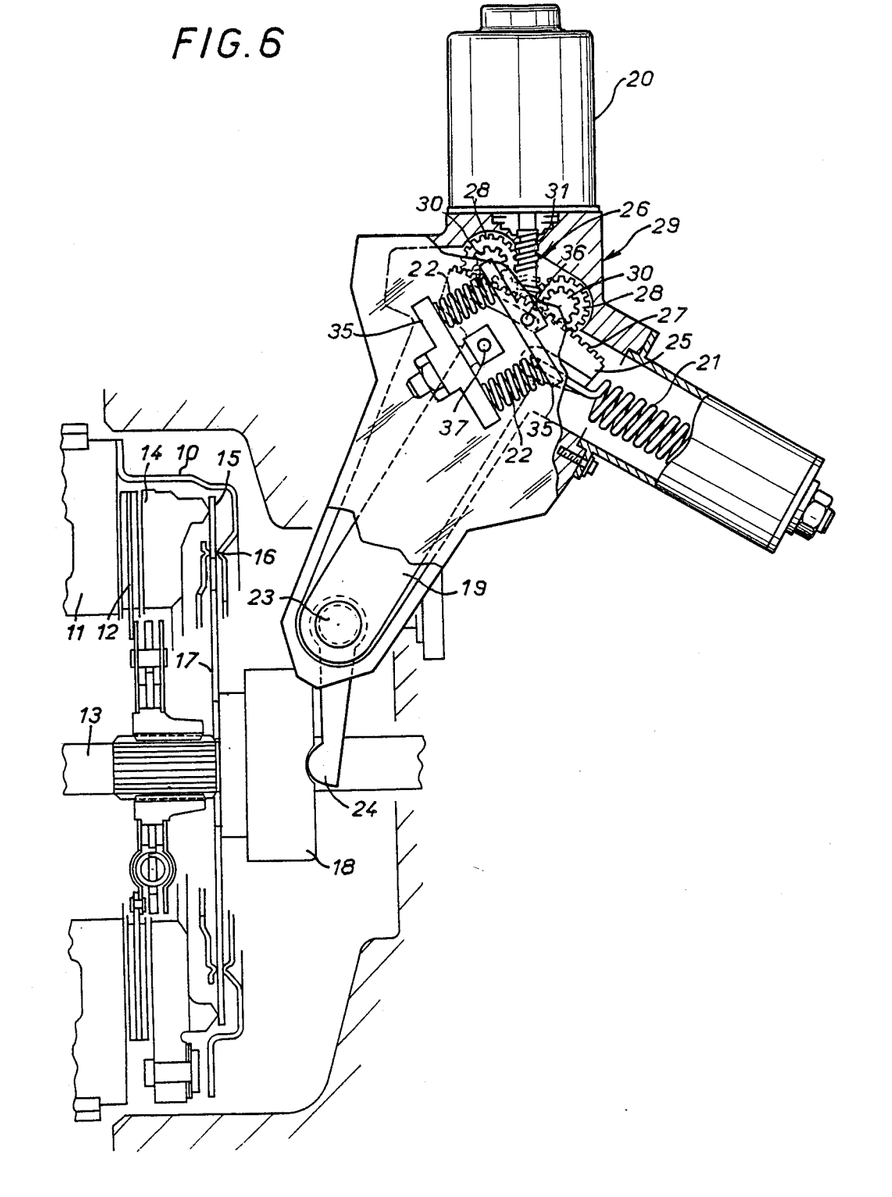
FIG. 6 is a view similar to FIG. 1, but in which the clutch is in the disengaged state.
Figure 7:
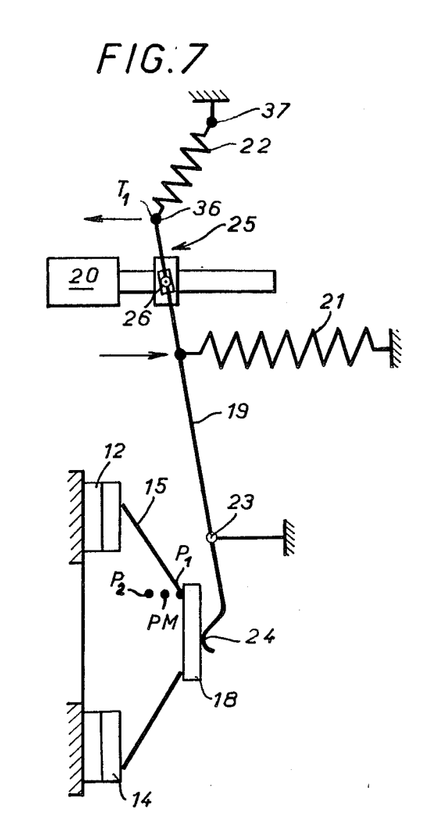
FIGS. 7, 8 and 9 illustrate diagramatically the operation of the control mechanism, in the limit position of engagement of the clutch, in an intermediate position and in the limit position of disengagement of the clutch respectively.
Figure 9:
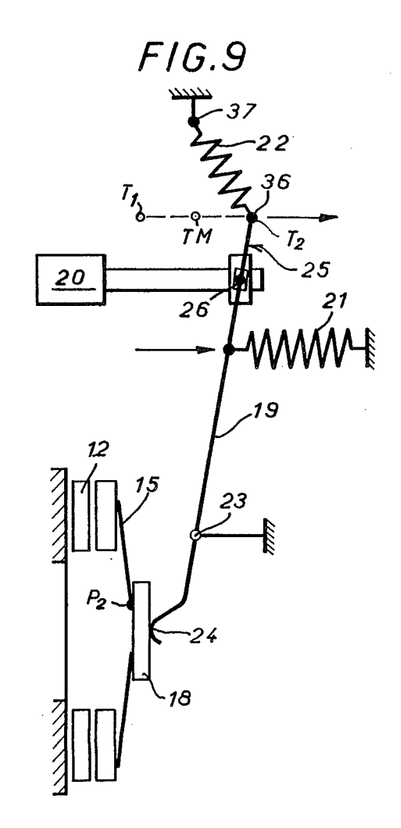
Figure 10:
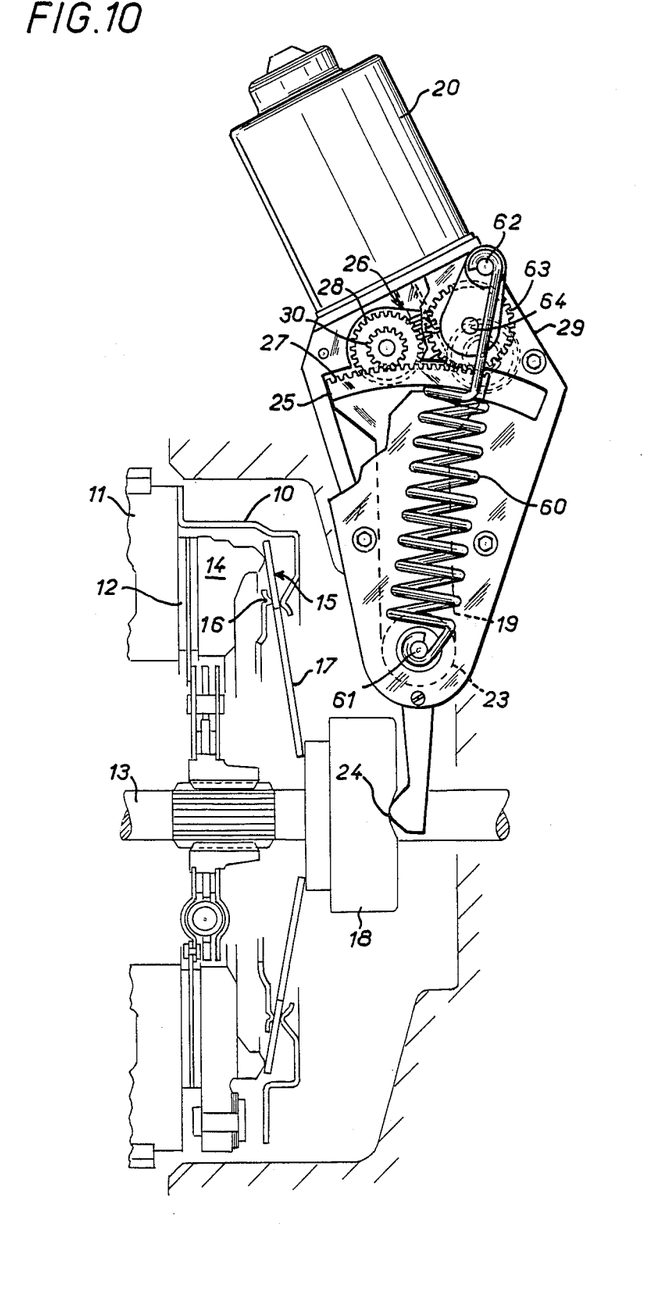
FIG. 10 is a view similar to FIG. 1, but relates to a variant.

The diaphragm 15 bears against the cover 10 at 16 and exhibits in its central region fingers 17 adapted to be pushed to the left in FIGS. 1 and 7 by a clutch disengaging abutment or stop 18 when it is desired to transfer the clutch from its engaged state shown in FIGS. 1 to 7, where the stop 18 has no action on the diaphragm 15, into a disengaged state shown in FIGS. 6 and 9, where the stop 18, pushing against the diaphragm 15, cancels the clamping action of the pressure plate 14, which releases the friction disc 12.

Thus the state of the clutch is modified as a function of the position of the movable train formed by the pressure plate 14 and by the diaphragm 15.

This train 14, 15 is movable in both directions through a stroke defined between a first limit position P1 (FIG. 7) in which the clutch is engaged and a second limit position P2 (FIG. 9) in which the clutch is disengaged. The diaphragm 15 forms elastic return means urging the train 14, 15 into the first limit position P1.

The clutch disengaging stop 18 forms part of an opposing means 18, 19 which is associated with the train 14, 15. This opposing means is movable through a stroke which corresponds, position by position, to that of the train. The stroke of the opposing means 18, 19 is defined between a first limit position T1 (FIG. 7) which corresponds to the limit position P1 of the train 14, 15, and a second limit position T2 which corresponds to the limit position P2 of the train 14, 15.

It should be observed that the means 18, 19 may be of any appropriate nature, particularly mechanical. It may, if required, comprise hydraulic parts such as a liquid column et cetera.

The means 18, 19 is thus adapted to act upon the train 14, 15 in order to transfer the latter from its first limit position P1 into its second limit position P2 and vice versa.

Positioning operative means 20 are provided associated with the opposing means 18, 19 and have the effect of fixing any instantaneous position of the opposing means 18, 19 independently of the elastic return means 15 of the train 14, 15.

These positioning operative means 20 are adapted to move the opposing means 18, 19 through the stoke T1-T2 or T2-T1 of the latter in order to cause a corresponding movement of the train 14, 15 through its own stroke P1-P2 or P2-P1. Elastic operating force moderating means 21, 22 are likewise associated with the means 18, 19.

The means 18, 19 (FIGS. 1-9) comprises a lever 19 which is fitted pivotably about a fixed pivot 23. A first end 24 of the lever 19 forms a fork juxtaposed with the clutch disengaging stop 18 which is itself juxtaposed with the diaphragm 15. The second end 25 of the lever 19 cooperates, on the first hand, by a joint forming a reducer 26, with the operative means 20 consisting of an electric motor, on the second hand with elastic compensating means 21, and on the third hand with elastic stabilising means 22.

The whole of the elastic compensating means 21 and of the elastic stabilising means 22 forms the elastic operating force moderating means 21, 22.

The lever 19 comprises at its second end 25, for its drive by the electric motor 20, a toothed sector 27 which meshes with two pinions 30 mounted rotatably on the fixed frame 29. The pinions 30 are fixed to larger pinions 28 which mesh with a worm 31 to form the connection forming the reducer 26. The screw 31 has opposite-handed threads which cooperate, the one with one of the pinions 28 and the other with the other pinion 28, in order to compensate any reaction in an axial direction of the screw 31.

The screw 31 is driven in rotation by the electric motor 20. This electric motor 20 is adapted to be either stopped, or driven forwards, or driven backwards.

The elastic compensating means comprise a helicoidal spring 21 which is attached between the fixed frame 29 at 32 and a hooking hole 33 made in the end 25 of the lever 19.

The compensating spring 21 always acts upon the means 19 in the direction towards the second limit position P2, that is to say in the opposite direction to that of the action of the diaphragm 15. The compensating spring 21 has a force of between 20% and 80%, and preferably nearly 50%, of the force of the diaphragm 15, these forces being measured along the axis of the device, in the region of action of the opposing means 18, 19 upon the train 14, 15, that is to say at the level of the clutch disengaging stop 18.

This compensating spring 21 has the effect of reducing the operating force required of the motor to move the means 18, 19 and to make this operating force minimal in an intermediate position TM (FIG. 8) which is located between the limit positions T1 and T2 and which depends upon the force chosen for the spring 21. This position TM is, for example, halfway between the positions T1 and T2 when the force of the spring 21 is half that of the diaphragm 15.

The operating force is thus made maximal, although dimished by half, in each of the limit positions T1 and T2. It is exerted in one direction near the limit position T1 and in the other direction near the limit position T2.

It is precisely in order to reduce further these maximum values of the operating force, and to bring them near to the minimum value in the intermediate position TM, that the elastic stabilising means are provided.

These elastic stabilising means comprise two helicoidal springs 22 interposed between two plates 34 and 35. The plate 35 is articulated at 36 on the second end 25 of the lever 19. The plate 35 is articulated at 37 on the fixed frame 29.

Figure 2:
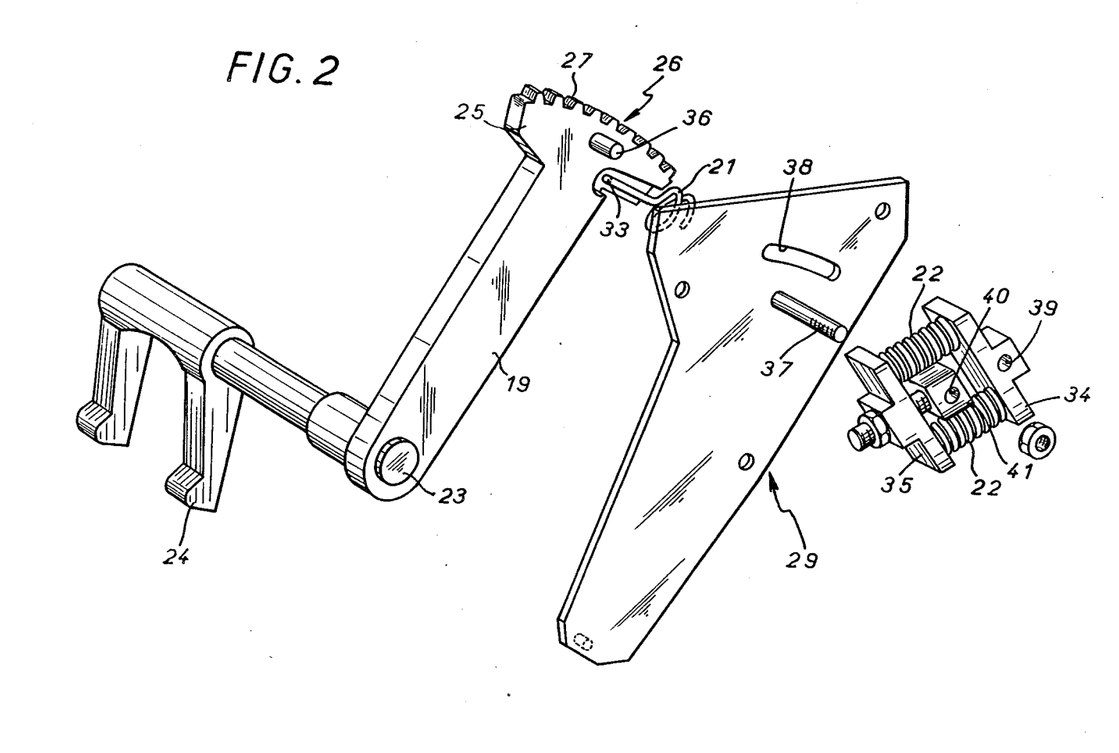
FIG. 2 is an exploded perspective view of this control mechanism.
Figure 3:
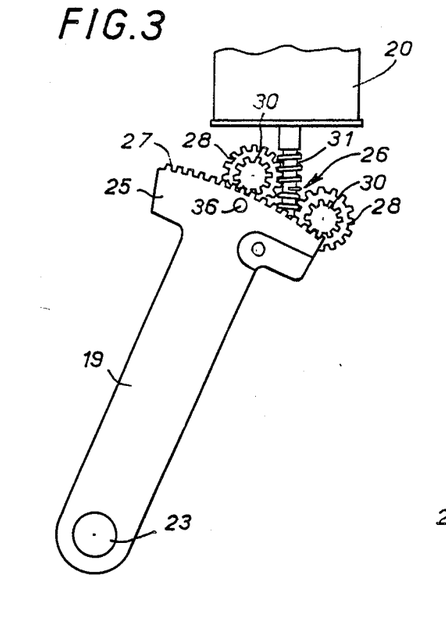
FIGS. 3, 4 and 5 are respectively views of various elements of the control mechanism, illustrated separately.
Figure 4:
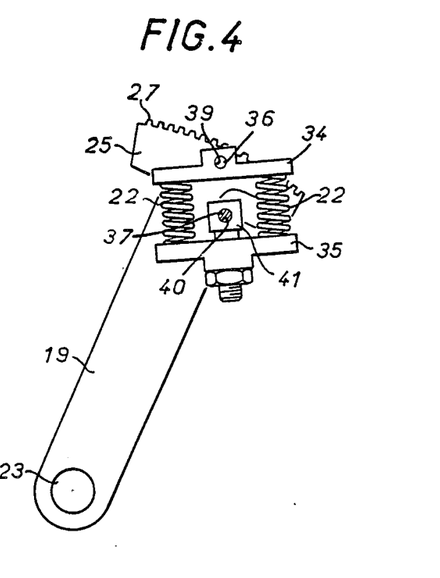
Figure 5:
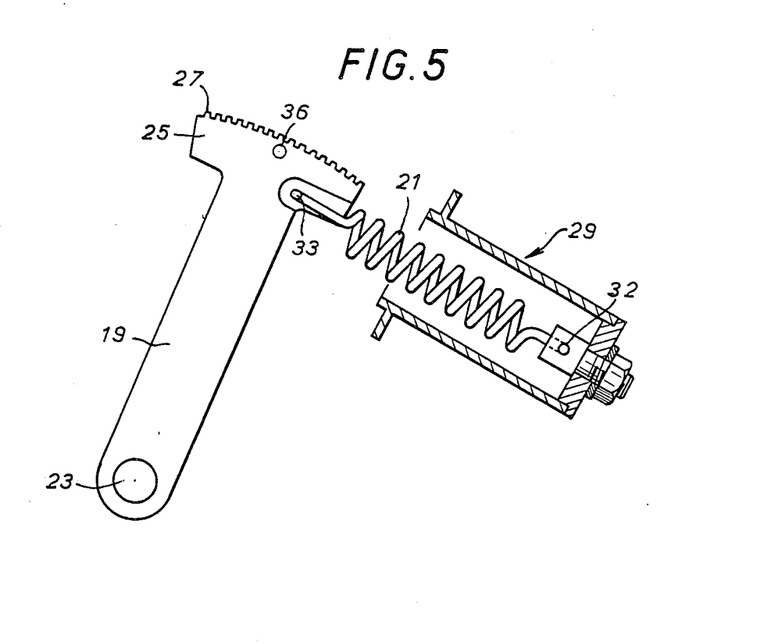

It will be observed in FIG. 2 that the frame 29 comprises an elongate port 38 which is penetrated by a shaft end 36 fixed to the lever 19, and on which a hole 39 of the plate 34 is engaged. It will likewise be observed in FIG. 2 that the fixed frame 29 comprises an axis 37 on which a hole 40 made in a piece 41 fixed to the plate 35 is engaged.

The stabilising springs 22 have a force of between 20% and 80%, and preferably nearly 50%, of the force of the diaphragm 15, the forces being measured along the axis of the device, in the region of action of the opposing means 18, 19 upon the train 14, 15, that is to say at the level of the clutch disengaging stop 18.

Figure 8:
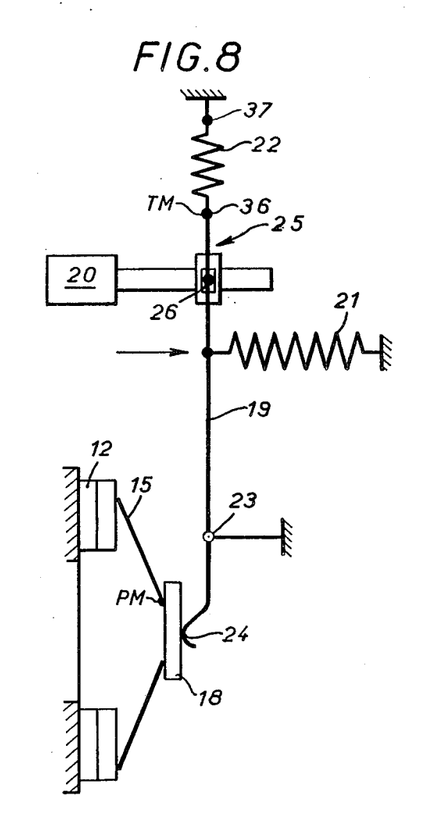

It will be observed in FIG. 8 that the points 36 and 37 between which the stabilising means 22 acts are aligned with the pivot 23 of the lever in the above-mentioned intermediate position TM of the lever 19.

The action of the elastic stabilising means 22 is reversed when the means 18, 19 passes through said intermediate position TM (FIG. 8).

The action of these elastic stabilising means 22 is zero when the opposing means 18, 19 occupies this intermediate position TM (FIG. 8). The elastic stabilising means 22 acts in the direction towards the first limit position T1 when the opposing means 18, 19 occupies a position located between the intermediate position TM and the limit position T1. The elastic stabilising means 22 act in the direction towards the second limit position T2 when the opposing means 18, 19 occupies a position located between the intermediate position TM and the second limit position T2.

Thus the required operating force which the electric motor 20 has to develop is extremely low throughout the stroke between the positions T1 and T2 and vice versa.

When the force of the spring 21 and that of the springs 22 are equal, for each of them, to approximately half that of the diaphragm 15, these various forces being measured along the axis of the device at the level of the stop 18, the reducing connection 26 comprising the worm 31 may be provided indiscriminately reversible or irreversible, as a function of the inclination of its screw threads, since in either case the operative means 20 are made positioning by virtue of the permanent state of quasi-equilibrium with which they are confronted throughout the stroke. If the ratios of force of the springs 21 and 22 and the diaphragm 15 do not satisfy this condition, the worm 31 is advantageously provided irreversible by an appropriate choice of the inclination of its threads, so as to make the operative means 20 positioning in all cases.

In operation (FIGS. 7, 8 and 9) when the electric motor 20 occupies a position in which the opposing means 18, 19 is itself in the limit position T1, the means 18, 19 exerts no action upon the diaphragm 15 at 24 through the intermediary of the stop 18. In FIG. 7, the effects of the springs 21 and 22 cancel each other. The clutch is engaged with an engaging force which is calibrated by the elastic force of the diaphragm 15.

To disengage the clutch, the electric motor 20 is made to turn in the direction corresponding to the transfer of the opposing means 18, 19 from the limit position T1 into the limit position T2. This being done (FIGS. 8 and 9), the means 18, 19 overcomes the elastic resistance of the diaphragm 15 and causes the disengagement of the clutch by releasing the disc 12 (FIG. 9). The effects of the springs 21 and 22 are added together in FIG. 9.

In each of the instantaneous positions of the opposing means, these means are fixed in position irrespectively of the elastic reaction of the diaphragm 15. But at the same time, the operating force which the motor 20 has to develop is extremely low, which permits a low power to be provided for this motor 20, for example comparable to that of a motor vehicle windshield wiper motor, namely a low power of the order of 50 watts.

To re-engage the clutch, the operation is performed in an equally easy manner but in the opposite direction, passing from the position of FIG. 9 via the position of FIG. 8 into the position of FIG. 7. There again, the electric motor has to develop only a low operating force. In the position of FIG. 7, the clutch is engaged by the action of the full elastic force of the diaphragm 15, in no way reduced by the action of the springs 21 and 22, the effects of which cancel each other.

It will be appreciated that the low power of the electric motor 20 permits automation under convenient conditions and with small dimensions.

As a variant (FIGS. 10-17), the elastic force moderating means comprise at least one spring 60 (a single spring in the example illustrated in FIGS. 10-27), one end of which is attached to an anchorage point 61, for example, a fixed point 61 as illustrated, coaxial with the fixed pivot 23 of the lever 19 upon the frame 29. The spring 60 may likewise be attached to any point of the lever 19.

The other end of the spring 60 is attached at 62 to a pinion 63. This pinion is fitted rotatably about an axle 64 fixed to the frame 29. The pinion 63 is engaged with a rack which, in the example illustrated in FIGS. 10-17, consists of the actual toothed sector 27 with which the pinions 30 mesh.

It will be appreciated (FIGS. 13-16) that the force F, illustrated by dotted lines, which is applied by the spring 60 to the pinion 63 breaks down into an inactive radial component R absorbed by the axis 64 of the pinion 63, and into an active tangential component A, shown by solid lines, transmitted to the lever 19 via the toothed sector 27.

It will be seen in FIGS. 13-16 that, if the force F remains substantially constant irrespective of the position, on the other hand the active component A varies widely. It is zero in FIG. 13, which corresponds to the position of engagement P1 and T1. It increases (FIG. 14) as far as an intermediate position illustrated in FIG. 15, and becomes smaller again afterwards in FIG. 16, which corresponds to the disengaged position P2-T2.

Figures 16, 17:
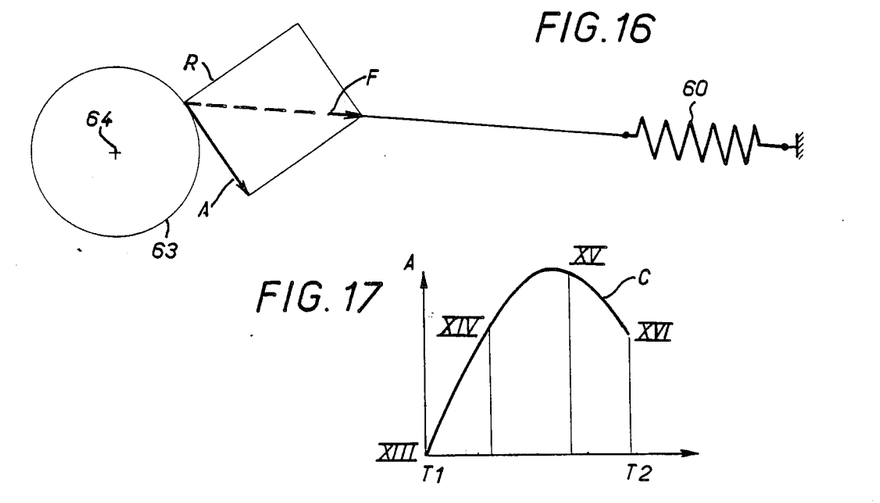
FIG. 17 is a graph showing the law of variation of the active component of the force moderator spring as a function of the stroke and illustrating the operation in the various positions shown in FIGS. 13 to 16 respectively.

The graph of FIG. 17 illustrates the various positions corresponding to FIGS. 13, 14, 15 and 16, designating them by the references XIII, XIV, XV and XVI respectively.

It will be seen that in practice it is convenient to give the curve C, which is illustrated in FIG. 17 and passes through the points XIII, XIV, XV and XVI, illustrating the variations of the active component A as a function of the stroke T1-T2, a desired shape. Particularly, the construction according to the invention makes it possible to obtain in any case, in the part XIII-XV, a spring characteristic which is the weaker as the elongation is greater, a characteristic which is generally unusual but which is desirable here. It will also be noted that, in the part XV-XVI of the curve, the characteristic has been given a more conventional shape, in which the resistance posed by the spring is the weaker as the elongation itself is smaller. It is the combination of the characteristics of the curve C passing through XIII, XIV, XV and XVI which illustrates the variable value desired for the active component A.

More particularly, it will be noted that the active component A, in absolute value and in opposition, varies as a function of the stroke of the gear 18, 19 approximately according to the same law as that according to which the force of the elastic return means 15 is itself made to vary as a function of the stroke of the train.

By virtue of this arrangement, the elastic force moderating means formed by the spring 60 permit a considerable reduction of the required operating force which has to be developed by the electric motor 20 throughout the stroke between the positions T1 and T2 and vice versa.

In operation (FIGS. 11 and 12) when the electric motor 20 occupies a position in which the opposing means 18, 19 itself occupies the limit position T1 (FIG. 11), the means 18, 19 exert no action upon the diaphragm 15 at 24 through the intermediary of the stop 18. The active component A of the spring 60 is zero in this position of FIG. 11. The clutch is engaged with an engaging force which is the elastic force of the diaphragm 15.

To disengage the clutch, the electric motor 20 is made to turn in the direction which corresponds to the transfer of the means 18, 19 from the limit position T1 into the limit position T2. This being done (FIG. 12), the means 18, 19 overcomes the elastic resistance of the diaphragm 15 and causes disengagement of the clutch by releasing the disc 12 (FIG. 12).

During this disengaging operation, the active component A of the force moderating spring 60 varies in the way illustrated in the graph of FIG. 17, that is to say practically with the same law as that which the diaphragm 15 obeys. This permits a reduced operating force.

Figure 11:
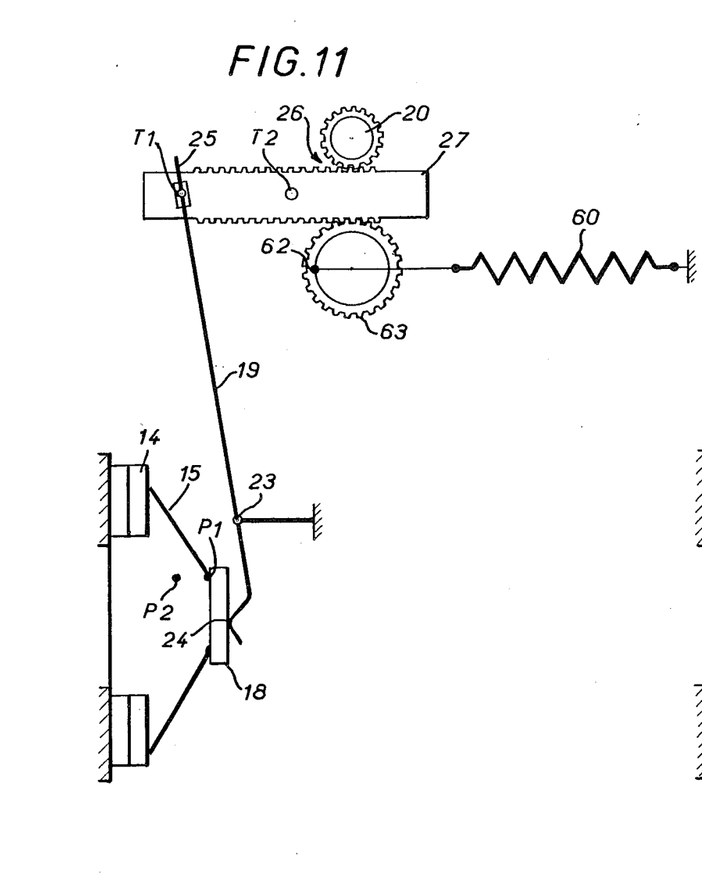
FIGS. 11 and 12 illustrate diagramatically the operation of this variant, in the limit position of engagement of the clutch and in the limit position of disengagement of the clutch respectively.
Figure 12:
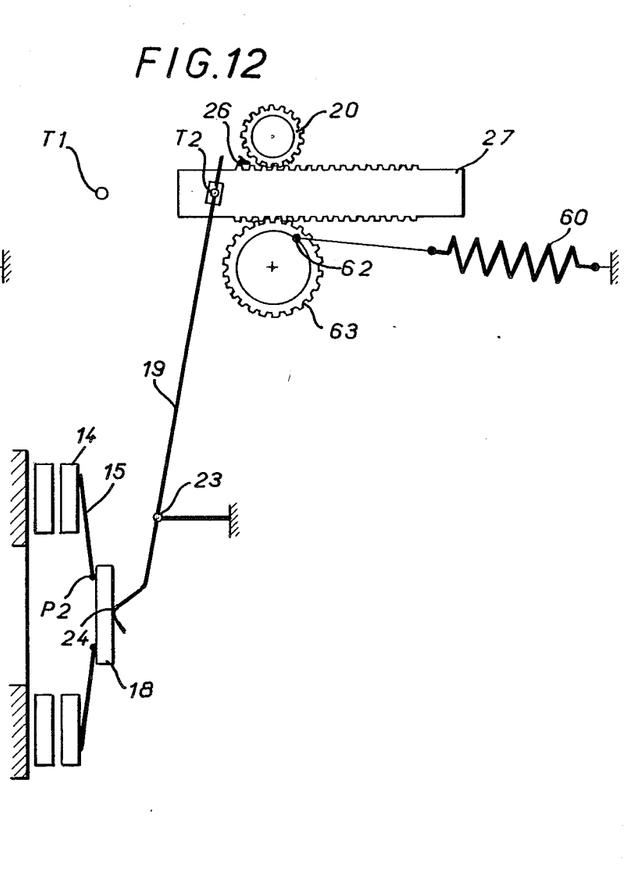
Figure 13:
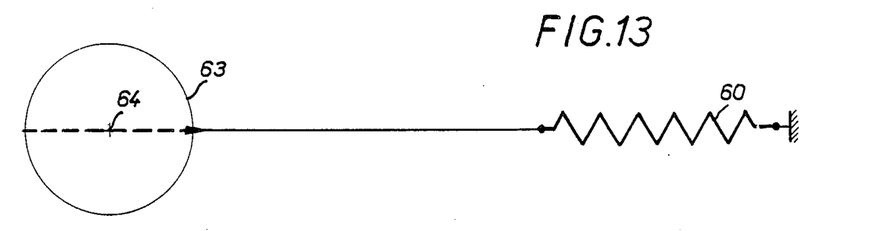
FIGS. 13, 14, 15 and 16 illustrate the mode of action of the force moderating spring in various positions.
Figure 14:
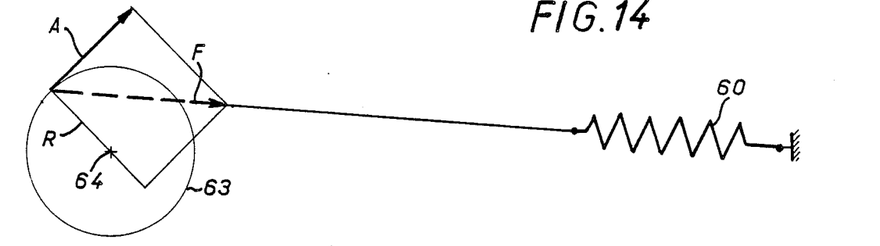
Figure 15:
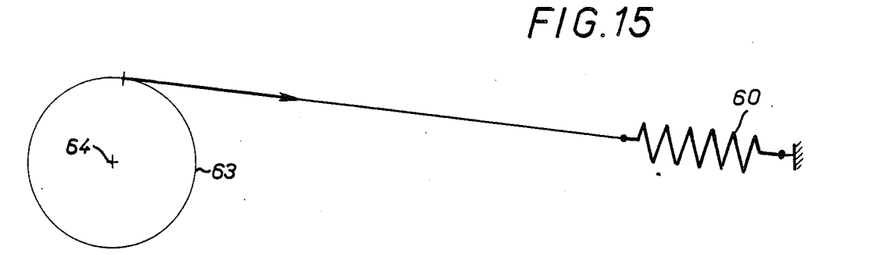

To re-engage the clutch, the operation is performed in an equally easy manner but in the opposite direction, by passing from the position of FIG. 12 into the position of FIG. 11. There again, the electric motor 20 has to develop only a low operating force. In the position of FIG. 11, the opposing means is engaged by the action of the full elastic force of the diaphragm 15, in no way reduced by the spring 60, the active component A of which is then zero, as is clear from the above.

Figure 18:
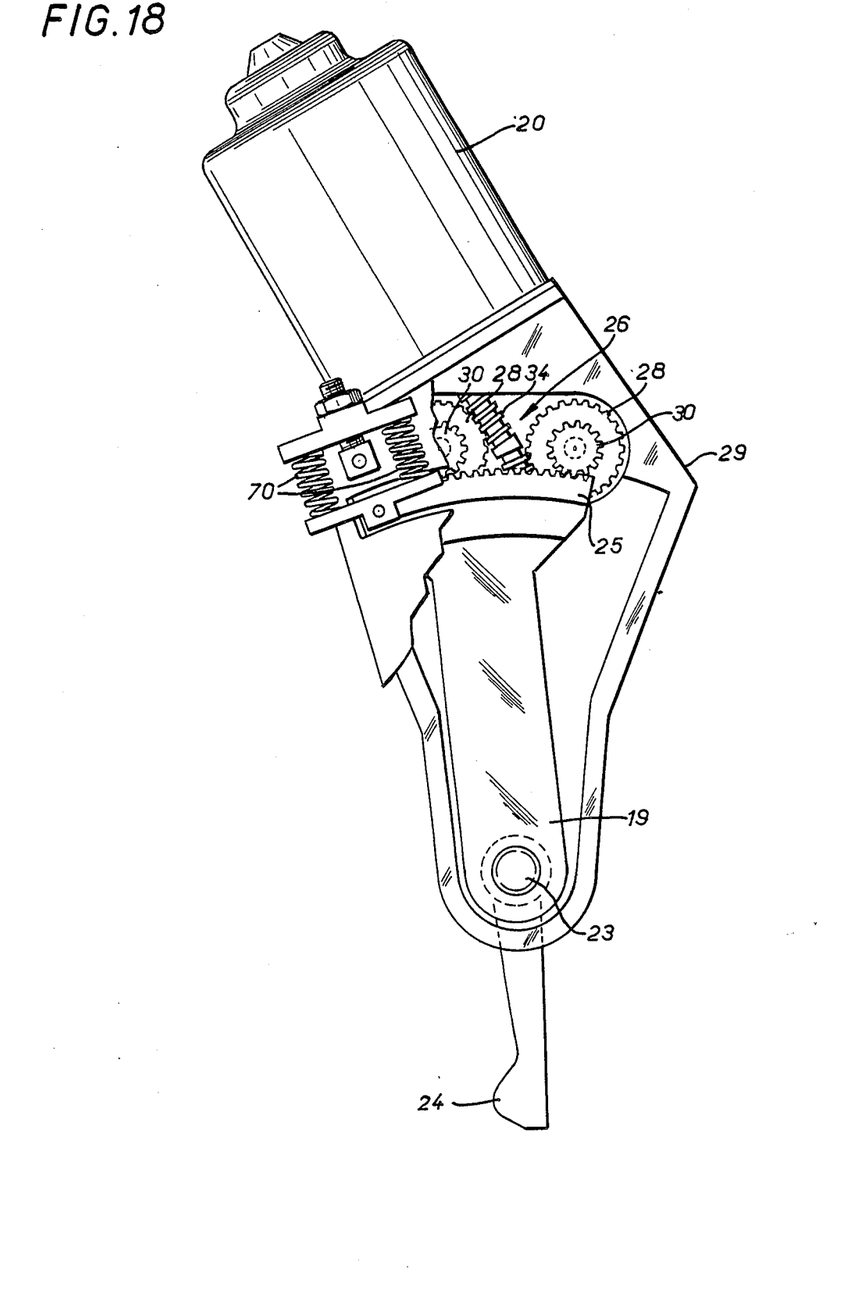
FIGS. 18, 19 and 20 relate to another variant.

As a variant (FIGS. 18-20), the arrangement is similar to that which has just been described with reference to FIGS. 10-17, but the pinion 63 is omitted and the force moderating spring, designated 70 (two springs 70 are provided side by side here) acts directly upon the toothed sector rack 25.

Figure 19:
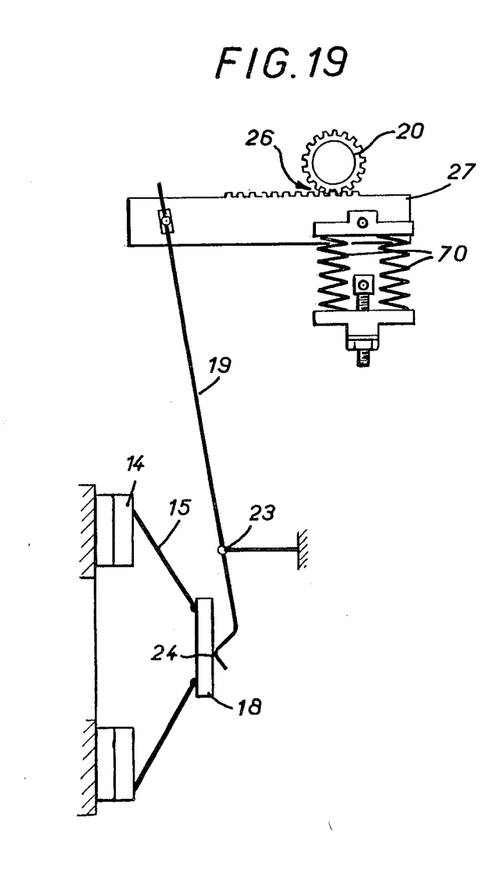
Figure 20:
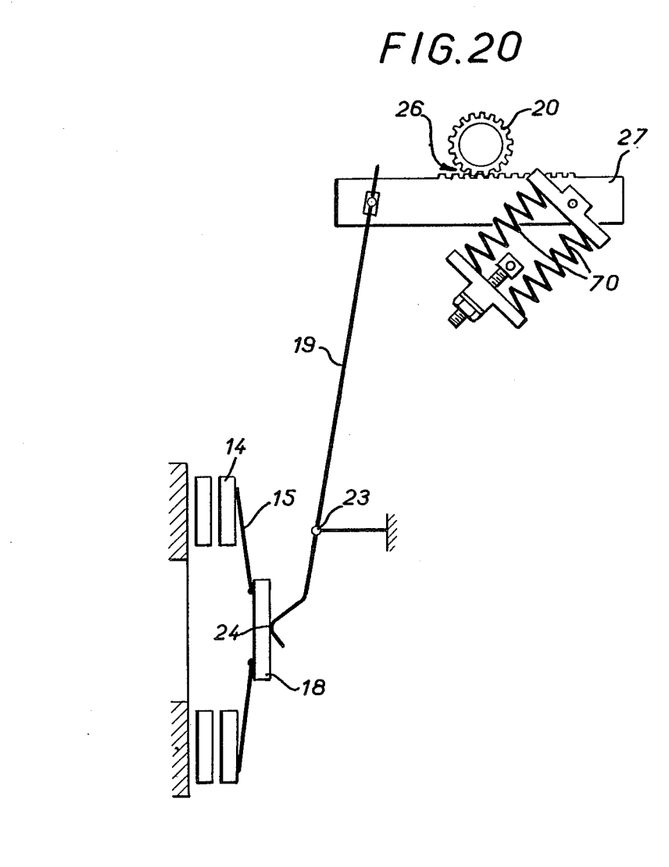

As previously, the elastic force breaks down into, on the one hand, an inactive component absorbed on the frame, and on the other hand an active component which obeys the law of variation of the force as a function of the stroke. FIG. 19 shows the engaged state, in which the springs 70 have no effect upon the rack, and FIG. 20 the disengaged state in which the springs 70 are active.

Figure 21:
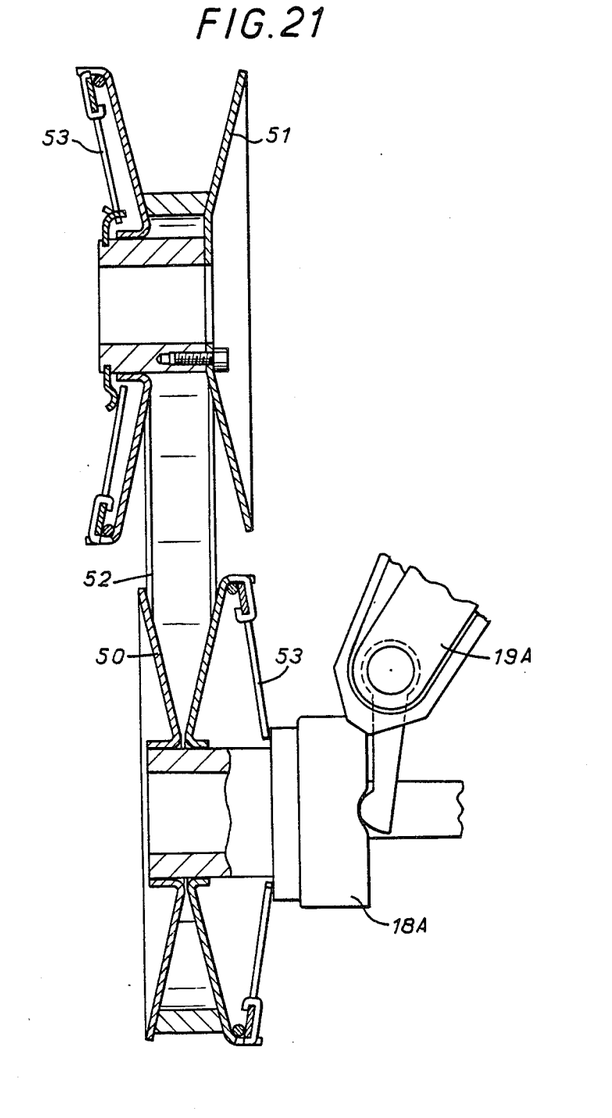
FIG. 21 relates to another application of the invention, to a speed variator with pulleys and belt.

We refer now to FIG. 21 which relates to a variant in which the invention is applied to the control mechanism of a speed variator comprising two variable-spaced pulleys 50 and 51 connected by a belt such as the belt 52, for example of the thrust belt type comprising a large number of juxtaposed segments. The variable-spaced pulleys 50 and 51 are subject to the elastic action of diaphragm such as 53. One of the diaphragms 53 cooperates with a stop 18a similar to the stop 18 of FIGS. 1-9. The stop 18a forms part of an opposing means 18a, 19a similar to that which was described previously and which comprises the connections 26, the motor 20, the compensating spring 21 and the stabilising spring 22.

The operation is similar to that previously described.

I claim:

1. A motor-driven control mechanism and a mechanical drive control device controlled thereby, which mechanical drive control device includes a first part and a second part movable relative to said first part in both directions through a stroke defined between two limit positions, and elastic return means acting between said first and second parts; said control mechanism comprising linkage means associated with the second part and movable through a stroke simultaneously with the stroke of the second part and acting upon the second part to transfer the second part from a first of said limit positions to a second of said limit positions against the action of said elastic return means, and vice versa, motor-driven positioning means separate from the elastic return means for moving the linkage means under power in both directions throughout the stroke of the linkage means, and elastic force moderating means coupled to said linkage means and opposing the action of the elastic return means throughout the stroke of said second part and thereby reducing the force required to be exerted by said motor-driven positioning means; and force moderating means being operable to exert on said linkage means a force which varies through the stroke of the linkage means in both directions as the force exerted by the elastic return means on said second part.

2. Structure as claimed in claim 1, in which said mechanical drive control device is a clutch.

3. Structure according to claim 2, wherein a clutch release device is disposed between the linkage and said elastic return means, said second part including a pressure plate, said first part including a reaction plate.

4. Structure according to claim 1, wherein said elastic return means is in the form of an elastic return spring, and said force moderating means comprises a spring having an effective force/displacement curve similar to the spring force/displacement curve of said elastic return spring.

5. Structure according to claim 1, wherein said elastic return means comprises a diaphragm spring, said force moderating means having effective force/linkage displacement curve similar to the diaphragm spring force/movable part displacement curve.

6. Structure according to claim 5, wherein the effective force curve of said force moderating means passes through a relative maximum as the second part proceeds along its stroke from one of its limit positions to the other of its limit positions.

7. Structure according to claim 1, wherein said force moderating means exerts through said linkage means on said movable part a force substantially equal to and opposite that exerted by said elastic return means on said movable part throughout the entire stroke of said second part in both direction.

8. Structure according to claim 1, wherein movement transmission means is disposed between said force moderating means and said linkage means, for breaking down force applied by said force moderating means into an inactive component adapted to be absorbed by a frame and an active component which varies as a function of the position of said movable part.

9. Structure according to claim 8, wherein said transmission means comprises a pinion rotatably mounted about an axis defined by a shaft and meshing with a rack connected to said linkage means, said elastic moderating means comprising at least one spring, one end of said spring being attached to an anchorage point and the other end of said spring being attached to said pinion, the inactive component being radially of and absorbed by said shaft, the active component being tangential of said pinion and adapted to be transmitted to said rack.

10. Structure according to claim 9, wherein a further pinion meshes with said rack and is coupled to said motor driven positioning means.

11. Structure according to claim 8, wherein said force moderating spring means comprises a tension spring, said movement transmission means varying the active component such that the force applied to said linkage through said movement transmission means increases as the elongation of said tension spring decreases.

12. Structure according to claim 1, wherein said motor driven positioning means comprises an electric motor.

13. Structure according to claim 1, wherein said linkage means applies a force to said second part which passes through a relative maximum as the second part is displaced between one of the limit positions and the other of the limit positions.

* * * * *